US007006466B2

(12) United States Patent
Borst et al.

(10) Patent No.: US 7,006,466 B2
(45) Date of Patent: Feb. 28, 2006

(54) DYNAMIC RATE CONTROL METHODS AND APPARATUS FOR SCHEDULING DATA TRANSMISSIONS IN A COMMUNICATION NETWORK (75) Inventors: Simon C. Borst, Amsterdam (NL); Philip Alfred Whiting, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 850 days.

(21) Appl. No.: 09/803,247

(22) Filed: Mar. 9, 2001

(65) Prior Publication Data
US 2002/0191555 A1 Dec. 19, 2002

(51) Int. Cl.
H04Q 7/00 (2006.01)
(52) U.S. Cl. .................. 370/329; 370/352; 370/412
(58) Field of Classification Search ............... 370/348, 370/229–230, 232, 335, 342, 412, 443, 252, 370/337, 347, 329; 455/450, 452.1, 452.2
See application file for complete search history.

(56) References Cited

U.S. PATENT DOCUMENTS 5,914,950 A * 6/1999 Tiedemann et al. ......... 370/348
6,072,792 A * 6/2000 Mazur et al. ............... 370/345
6,590,890 B1 7/2003 Stolyar et al.
6,721,278 B1 * 4/2004 Rimhagen et al. .......... 370/252
2003/0185224 A1 10/2003 Ramanan et al.

FOREIGN PATENT DOCUMENTS

EP WO 95/34981 * 12/1995

OTHER PUBLICATIONS

U.S. Appl. No. 09/517,659, filed Mar. 3, 2000, S. Stolyar et al., "Method of Packet Scheduling, With Improved Delay Performance, for Wireless Networks.".
U.S. Appl. No. 09/393,949, filed Sep. 10, 1999, K. Ramanan et al., "Method and Apparatus for Scheduling Traffic to Meet Quality of Service Requirements in a Communication Network.".
A. Bedekar et al., "Downlink Scheduling in CDMA Data Networks," Proc. IEEE Globecom '99, pp. 1-32, 1999.
P. Bender et al., "CDMA/HDR: A Bandwidth-Efficient High-Speed Wireless Data Service for Nomadic Users," IEEE Communications Magazine, vol. 38, pp. 70-77, 2000.
U.S. Appl. No. 09/517,659, filed Mar. 3, 2000, S. Stolyar et al., "Method of Packet Scheduling, With Improved Delay Performance, for Wireless Networks.".

(Continued)

Primary Examiner—Bob Phunkulh
Assistant Examiner—Robert W. Wilson (57) ABSTRACT

The scheduling of data transmissions for a CDMA system downlink or other type of communication network is implemented on a dynamic basis using a revenue-based policy. For a given transmission slot or other transmission interval, a maximum-rate user is identified from among a set of users requesting data transmissions, and a data transmission of the maximum-rate user is scheduled for the given interval. The maximum-rate user is identified based on application of coefficients of a revenue vector to corresponding feasible rates of the requesting users. The revenue vector is determined in an iterative manner using an adaptive algorithm which updates the revenue vector periodically to compensate for observed deviations between actual and target throughput, such that the deviations are reduced over time and the revenue vector converges to an optimal revenue vector. Advantageously, the invention allows the revenue vector to be determined without direct estimation of the frequency of occurrence of particular user rates.

20 Claims, 4 Drawing Sheets

OTHER PUBLICATIONS

P. Bender et al., "CDMA/HDR: A Bandwidth Efficient High Speed Wireless Data Service for Nomadic Users," QUALCOMM, pp. 1-34, undated.

A. Bedekar et al., "Downlink Scheduling in CDMA Data Networks," Proc. IEEE Globecom '99, pp. 1-32, 1999.

P. Bender et al., "CDMA/HDR: A Bandwidth-Efficient High-Speed Wireless Data Service for Nomadic Users," IEEE Communications Magazine, vol. 38, pp. 70-77, 2000.

* cited by examiner

DYNAMIC RATE CONTROL METHODS AND APPARATUS FOR SCHEDULING DATA TRANSMISSIONS IN A COMMUNICATION NETWORK

RELATED APPLICATIONS

The present invention is related to the inventions described in U.S. patent application Ser. No. 09/517,659 filed in the name of inventors S. Stolyar et al. and entitled "Method of Packet Scheduling, With Improved Delay Performance, for Wireless Networks," now issued as U.S. Pat. No. 6,590,890, and U.S. patent application Ser. No. 09/393,949 filed Sep. 10, 1999 in the name of inventors K. Ramanan et al. and entitled "Method and Apparatus for Scheduling Traffic to Meet Quality of Service Requirements in a Communication Network," both of which are commonly assigned herewith and incorporated by reference herein.

1. Field of the Invention

The present invention relates generally to wireless communication systems and more particularly to techniques for scheduling data transmissions in wireless code division multiple access (CDMA) wireless systems and other types of communication networks.

2. Background of the Invention

Next-generation wireless networks are expected to support a wide range of services, including high-rate data applications. Examples of such wireless networks include those CDMA systems known in the art as IS-95B, cdma2000, third generation (3G), Universal Mobile Telephone System (UMTS) and wideband CDMA (WCDMA) systems. The high-rate data applications to be supported by these networks are generally characterized by bursty traffic. Moreover, in contrast to voice users, data applications can usually accept a certain amount of packet delay, as long as sufficient data throughput is provided over a particular interval. As a result of the bursty traffic and relative delay intolerance of data applications, scheduling techniques can be particularly effective in optimizing system throughput for such applications.

An example of a conventional scheduling technique particularly directed to the scheduling of high-rate data transmissions on a base-to-mobile link, i.e., downlink, of a CDMA system is described in A. Bedekar et al., "Downlink scheduling in CDMA data networks," Proc. IEEE Globecom '99, pp.2653–2657, 1999, which is incorporated by reference herein. Related techniques maybe applied in low-mobility scenarios, such as indoor networks. In such environments, Rayleigh fading frequencies can be quite low, and the fading levels can even be anticipated to some extent. For example, fading can be measured by having the base station provide a pilot signal which can be measured by all the users and utilized to generate corresponding signal-to-noise ratios (SNRs). The measurements can be fed back to the base station, and used to estimate fading levels and SNRs, and hence user rates, in subsequent slots. It is therefore possible to exploit the variations in the channel conditions so as to transmit to the user with the currently "best" channel. This type of an approach is utilized in the High Data Rate (HDR) technique developed by Qualconum. More particularly, in such a technique mobile users may be configured to make measurements on a common pilot signal, and to report the measurements on a dedicated uplink channel, e.g., a 3.2 kbps dedicated uplink channel. These and other aspects of the HDR technique are described in greater detail in P. Bender et al., "CDMA/HDR: a bandwidth-efficient high-speed wireless data service for nomadic users," IEEE Communications Magazine, Vol. 38, pp. 70–77, 2000, which is incorporated by reference herein.

The above-noted estimates of user rates for subsequent slots can provide a basis for scheduling user transmissions. However, the estimates fail to provide the probability that each user will have a given SNR and a potential maximum rate. Although it is possible to determine such probabilities from a joint distribution of user rate declarations, this would generally involve keeping records from slot to slot of the user rate declarations, and building up a relative frequency table, and would thus require excessive computational and memory resources in a practical system implementation. A need therefore exists for improved techniques for scheduling high-rate data transmissions, on a CDMA downlink or other type of communication network link, without requiring direct estimation of the frequency of occurrence of particular user rates.

SUMMARY OF THE INVENTION

The invention provides methods and apparatus for scheduling data transmissions in CDMA systems and other types of communication networks.

In accordance with one aspect of the invention, the scheduling of data transmissions for a CDMA system downlink or other type of communication network is implemented using a revenue-based policy. For a given transmission slot or other transmission interval, a maximum-rate user is identified from among a set of users requesting data transmissions, and a data transmission of the maximum-rate user is scheduled for the given interval. The maximum-rate user is identified based on application of coefficients of a revenue vector to corresponding feasible rates of the requesting users. The revenue vector is determined in an iterative manner using an adaptive algorithm which updates the revenue vector periodically to compensate for observed deviations between actual and target throughput. As a result, the deviations are reduced over time and the revenue vector converges to an optimal revenue vector. Advantageously, the revenue vector can be determined without direct estimation of the frequency of occurrence of particular user rates.

In accordance with another aspect of the invention, the maximum-rate user for which a data transmission is scheduled in an n-th transmission interval is a user m*(n) identified as follows:

$$m^*(n) = \arg \max_{m=1,\ldots,M} w_m R_m(n),$$

where $w_1, \ldots, w_M$ denote the coefficients of a revenue vector w, and $R_m(n)$ denotes the feasible rate for an m-th one of M users for the n-th transmission interval.

In accordance with a further aspect of the invention, convergence of the revenue vector to its optimal value is ensured by the adaptive algorithm periodically adjusting the coefficients of the revenue vector in accordance with a specified step size taken from a predetermined convergent sequence.

In accordance with yet another aspect of the invention, the adaptive algorithm updates the revenue vector based on sample periods which increase in size as a function of time. For example, the updates to the revenue vector occur at predetermined slots K(n), with the length of an n-th sample period given by L(n):=K(n+1)−K(n). The adaptive algorithm may be configured to update the revenue vector w(n) for an n-th sample period in accordance with an update direction v(w(n)). The update direction is determined based on throughput obtained during the n-th sample period when the revenue vector w(n) is used. At a subsequent update of the revenue vector for an (n+1)-th sample period, the revenue vector is recursively determined as $$w(n+1)=w(n)-\delta(n)v(w(n)),$$

where $\delta(n)$ denotes a step size of the above-noted predetermined convergent sequence. The update direction v(w(n)) may be determined by averaging the actual throughput for each user over the sample period, partitioning the users into a first group with above-average throughput and a second group with below-average throughput, decreasing the revenue vector coefficient values for the users in the first group, and increasing the revenue vector coefficient values for the users in the second group. As the size of the sample period increases, the actual throughputs will approach specified target throughputs.

DETAILED DESCRIPTION OF THE INVENTION

The present invention will be illustrated below in conjunction with an exemplary code division multiple access (CDMA) wireless communication system. It should be understood, however, that the invention is not limited to use with any particular type of communication system, but is instead more generally applicable to any wireless system in which it is desirable to provide improved scheduling of data transmissions. For example, although the techniques are illustrated with reference to certain types of CDMA systems, it will be apparent to those skilled in the art that the techniques are also applicable to other CDMA systems, as well as to other types of wireless systems and communication networks.

EXAMPLE SYSTEM

Figure 1:
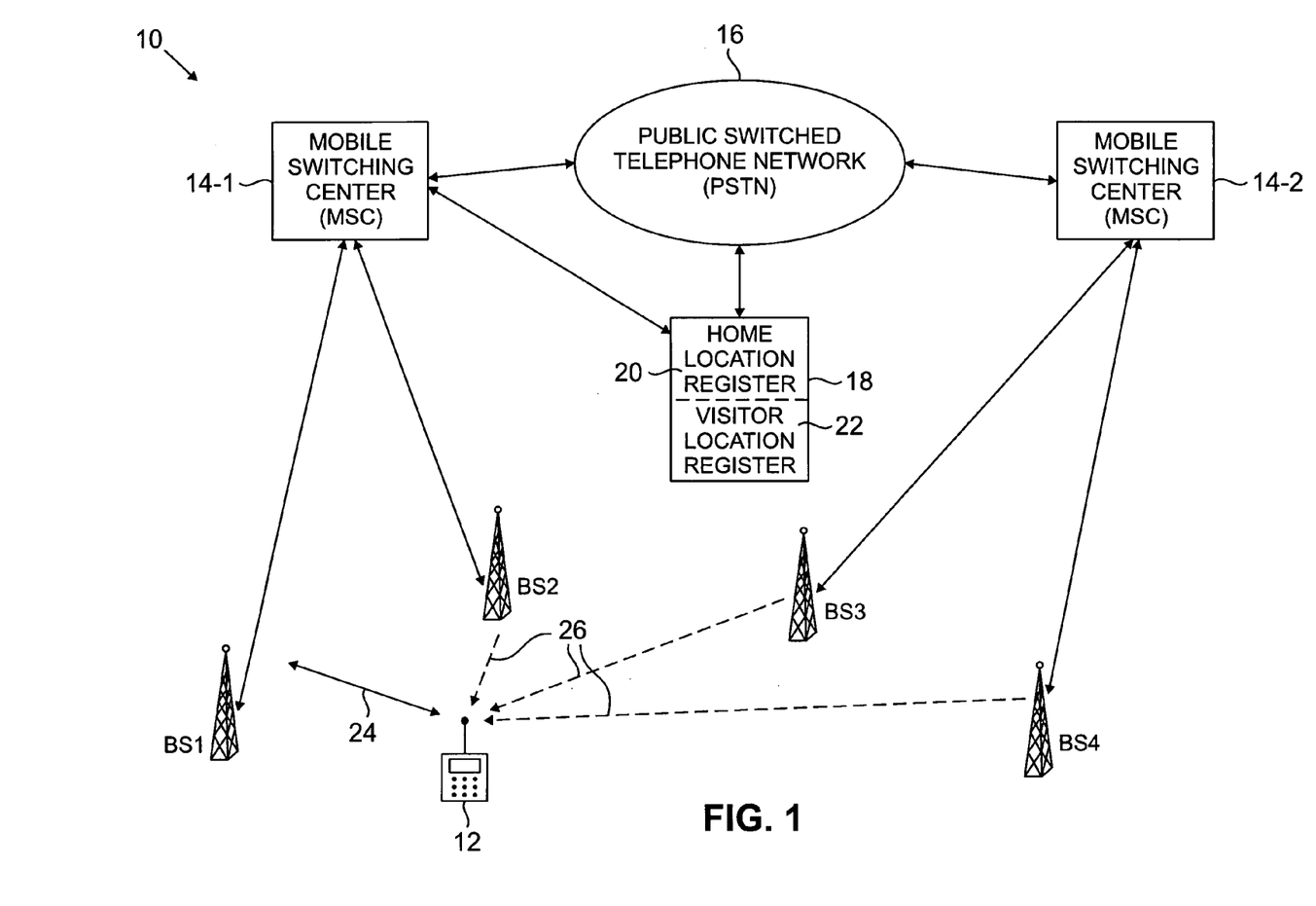
FIG. 1 shows an exemplary code division multiple access (CDMA) wireless communication system in which a technique for scheduling of data transmissions in accordance with the invention is implemented.

FIG. 1 shows an exemplary CDMA wireless cellular system 10 in which a data transmission scheduling technique of the invention is implemented. The system 10 may be configured in accordance with well-known conventional wireless communication system standards. The system 10 as illustrated includes a mobile station (MS) 12 and a number of base stations BS1, BS2, BS3 and BS4. The base station BS1 of FIG. 1 represents a primary base station, communicating with mobile station 12 via the path designated by solid two-way arrow 24, while the surrounding base stations BS2, BS3 and BS4 may serve as secondary base stations which can detect signals transmitted via the paths indicated by dashed one-way arrows 26. The primary base station BS1 communicates with the mobile station 12 using CDMA techniques that are well known in the art. As the mobile station 12 moves within the system 10, handoffs occur, such that base stations other than BS1 become primary base stations for communicating with the mobile station 12. Also, handoffs may occur from a given antenna sector of the primary base station and another sector of that base station.

Transmissions from a given base station of the system 10 to the mobile station 12 are referred to as base-to-mobile or downlink transmissions. Transmissions from the mobile station 12 to a given base station of the system 10 are referred to as mobile-to-base or uplink transmissions.

The system 10 in this illustrative embodiment also includes first and second mobile switching centers (MSCs) 14-1 and 14-2. A given MSC typically connects several BSs with a public switched telephone network (PSTN) 16. For example, MSC 14-1 connects base stations BSI and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

The system of FIG. 1 is shown in simplified form for purposes of illustration, and will generally include a substantially larger number of base stations and mobile stations, as well as other system elements that are not explicitly shown in the figure. Each of the mobile stations within the system is more generally referred to herein as a "user." It should be noted that the term "user" is intended to include not only mobile stations, but also any other type of subscriber unit of a given system, including, e.g., fixed wireless subscriber units.

Figure 2:
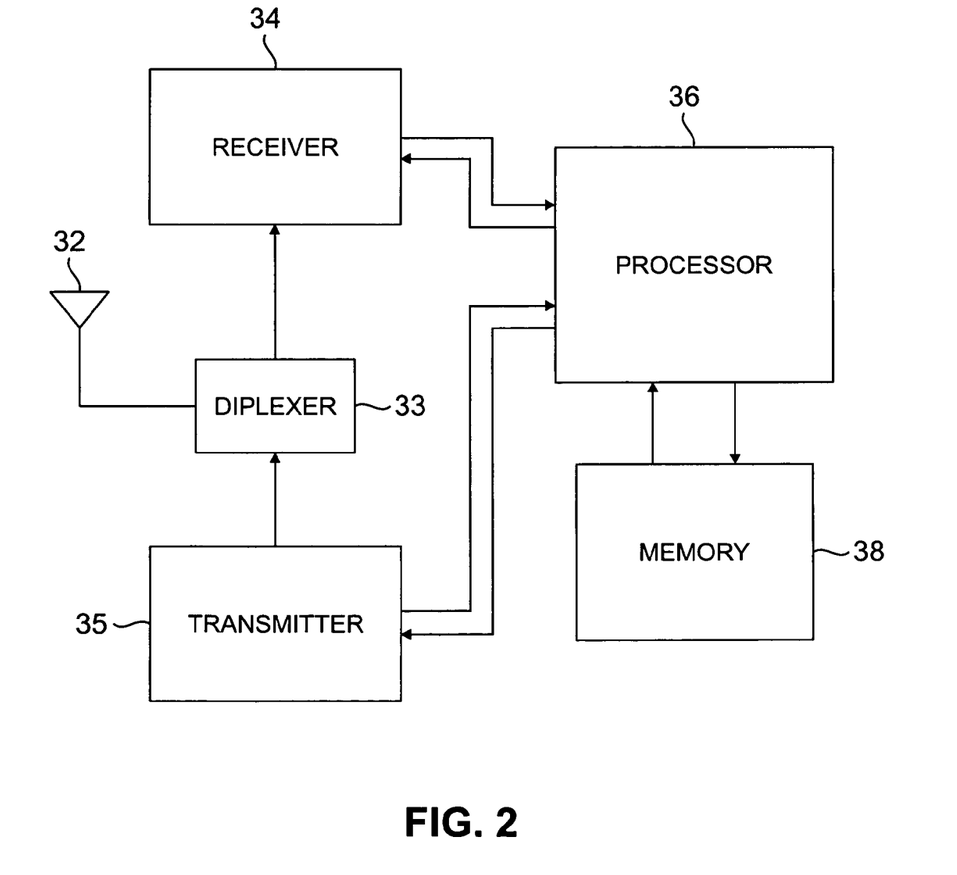
FIG. 2 is a block diagram showing a base station which is utilized in the FIG. 1 system for scheduling data transmissions in accordance with the invention.

FIG. 2 shows a more detailed view of an apparatus which represents a given one of the base stations BS1, BS2, BS3 or BS4 of the system 10. The apparatus includes an antenna 32 which receives signals from and transmits signals to other elements of the system 10. A receive signal is directed by a diplexer filter 33 to an input of a receiver 34 which may implement conventional downconversion, demodulation, digital-to-analog conversion and other processing of the receive signal. A transmitter 35 performs complementary operations such as analog-to-digital conversion, modulation and upconversion to generate a transmit signal which is directed via diplexer 33 to the antenna 32 for transmission.

A processor 36 is coupled to both the receiver 34 and the transmitter 35. The processor 36 operates in conjunction with a memory 38 to control the communication functions of the base station BSi. For example, data or other information in messages which are part of a receive signal may be supplied to or otherwise processed by a processor 36 such that processor 36 can implement data transmission scheduling techniques to be described in greater detail below.

General Scheduling Approach

The present invention provides improved techniques for scheduling of high-rate downlink data transmissions in a CDMA wireless system such as that illustrated in conjunction with FIGS. 1 and 2. Advantageously, the techniques of the invention avoid the need for direct estimation of the frequency of occurrence of particular user rates.

As previously noted, conventional scheduling techniques for high-rate data transmissions on a CDMA downlink may be configured to estimate the channel conditions, and to transmit to the user with the currently "best" channel. In accordance with an illustrative embodiment of the invention, the user having the "best" channel may be identified as a maximum-rate user when a set of feasible rates are weighed with appropriately-determined coefficients. Each of these coefficients may be viewed as a particular price or other reward value in a revenue vector, and the data transmission scheduling may then be viewed as a revenue-based policy which always assigns an available transmission slot to the user yielding the maximum revenue. The term "coefficient" as used herein in conjunction with a revenue vector is intended to include a price, reward value or any other revenue-related value that may comprise an element of the revenue vector. As will be described in detail below, the revenue vector coefficients are used to weight a set of feasible rates for system users eligible for data transmission, and are adjusted over time such that actual throughput ratios converge to target throughput ratios.

It should be noted that direct calculation of an optimal revenue vector of the type described above may be a difficult task, in that such direct calculation will generally require detailed information on the channel statistics. The present invention avoids such direct calculation by providing adaptive algorithms for determining the optimal revenue vector in an iterative manner, without the need for direct estimation of the frequency of occurrence of particular user rates. Starting from an arbitrary initial vector, the algorithms iteratively adjust the revenue vector coefficients to compensate for observed deviations from target throughput ratios. The adjustments ensure that discrepancies between actual and target throughput cannot persist, and are gradually reduced in size over time such that the revenue vector converges to the optimal revenue vector.

The illustrative embodiment will be described in conjunction with a base station serving M data users. The base station transmits in slots of fixed duration in this embodiment, although transmission intervals other than fixed-duration slots may be used in other embodiments. In each slot, the base station transmits to exactly one of the users. It is assumed that the feasible rates for the various users vary over time according to a stationary discrete-time stochastic process $\{(R_1(n), \ldots, R_M(n)\}$, n=1, 2, ..., with $R_m(n)$ representing the feasible rate for user m in the n-th slot. It is assumed that the base station has perfect knowledge of the maximum feasible rate $R_m(n)$ for user m at the start of the n-th slot. Let $(R_1, \ldots, R_M)$ be a random vector with a distribution corresponding to the joint stationary distribution of the feasible rates.

It should be noted that these and other assumptions made herein are for purposes of simplification and clarification of the description, and should not be construed as limiting the scope of the invention in any way. Alternative embodiments in which one or more of the assumptions do not apply will be apparent to those skilled in the art.

The above description allows for dependence between the feasible rates for the various users.

Independence may be a reasonable assumption in the case of an isolated base station serving a group of independent users. In the case of several base stations, however, the feasible rates may vary not only due to independent fading, but also because of the common impact of control actions at adjacent base stations. For example, base stations may transmit at reduced power if there are no backlogged users, inducing strong correlations in interference levels between users.

The slot duration in the illustrative embodiment may be assumed to be relatively short compared to the relevant time scales in the traffic patterns and delay requirements of the data users.

For example, the slot duration may be on the order of the 1.67 ms used in the above-noted HDR technique.

The M data users in the illustrative embodiment may be viewed as a subset of active backlogged users among a greater population, which may change over time. For scheduling purposes, however, the separation of time scales allows the subset of active users to be viewed as nearly static and continuously backlogged. In practice, flow control algorithms such as Transmission Control Protocol (TCP) will typically be used to feed the data into the base station buffer at a relatively slow rate, comparable to the actual throughput provided to the user over the wireless link. Thus, the bulk of the backlogs will usually reside at the sender rather than the base station buffer.

Throughput maximization is a common performance objective for high-rate data transmissions on a CDMA downlink, and may be the performance objective in the illustrative embodiment of the invention. It should be noted that this objective can be achieved simply by assigning each slot to the user with the currently highest feasible rate. The disadvantage of this approach is that typically only a few strong users will ever be selected for transmission, causing starvation of all others. An alternative approach which alleviates this problem is to equalize the expected throughput of the various users. This can easily be achieved by assigning each slot to the user with the currently smallest cumulative throughput. The disadvantage of this alternative approach is that it does not exploit the variations in the feasible rates. Moreover, by insisting on equal throughput, a few weak users may cause the throughput of all others to be dramatically reduced. Another approach is to equalize the proportion of slots allotted to the various users. Such an approach can be realized simply by using a round-robin scheduling technique. Again, however, this approach fails to take advantage of the fluctuations in the feasible rates. In addition, some users may end up with extremely low throughput, despite receiving their fair share of the number of transmission slots.

The present invention in the illustrative embodiment avoids the problems of the above-noted approaches by defining throughput target values $\alpha_1, \ldots, \alpha_M$ for the various users. These target values may be set arbitrarily, taking into account the Quality-of-Service (QoS) requirements of the users, or possibly their current activity levels or locations. For example, the target values may be set lower for users with higher path losses, in order to prevent weak users from dragging down the throughput of all other users. The target values may also be applied to the proportion of transmission slots allotted to the various users.

Some additional notation will now be introduced. Let $Y_m(n):=X_m(n) R_m(n)$, with $X_m(n)$ a 0–1 variable indicating whether or not the n-th slot is assigned to user m. Further define:

$$y_m(N) := E\left[\sum_{n=1}^{N} Y_m(n)/N\right]$$

as the expected average throughput received by user m after N slots. The illustrative embodiment considers the problem of maximizing the minimum long-run expected average normalized throughput $$z := \min_{m=1,\ldots,M} y_m / \alpha_m,$$

with $y_m := \lim \inf_{N \to \infty} y_m(N)$. The above problem may equivalently be formulated as maximizing z subject to the constraint $z \leq y_m / \alpha_m$ for all $m=1, \ldots, M$. The constraints may in fact be tightened to $z = y_m / \alpha_m$, since one can always reduce the throughput for the users with a surplus. With the equality constraints in place, the objective function may then be generalized to $$\sum_{m=1}^{M} w_m y_m / \alpha_m$$

for any positive vector $w \in \mathbb{R}_+^M$.

The above-stated problem is thus equivalent to maximizing an arbitrary weighted sum of the throughputs, subject to the normalized throughputs being equal. Thus, any scheduling strategy which maximizes an arbitrary weighted combination of the throughputs, while equalizing the normalized throughputs, is optimal.

A class of revenue-based scheduling strategies for implementing the above-described maximization will now be introduced. Assume there are rewards $w_1, \ldots, w_M$ per bit transmitted to the various users. A revenue-based scheduling strategy assigns the n-th transmission slot to the user $m^*(n)$ with the current maximum rate-reward product, i.e., $$m^*(n) = \arg\max_{m=1,\ldots,M} w_m R_m(n).$$

Clearly, the above revenue-based scheduling strategy maximizes the revenue earned in each individual slot, and thus the total cumulative revenue as well as the average revenue. Different tie-breaking rules may be used. However, regardless of the particular tie breaking rule used in a given implementation, this revenue-based scheduling strategy will definitely not assign the n-th slot to any user k with $$w_k R_k(n) < \max_{m=1,\ldots,M} w_m R_m(n).$$

It should be noted that revenue is simply a weighted combination of the throughputs, and thus any revenue-based policy which balances the throughputs, is in fact optimal. It should also be noted that setting throughput targets is equivalent to normalizing the feasible rates by the corresponding values. Therefore, it will be assumed in the following description that the throughput target values are discounted for in the rates, such that $(\alpha_1, \ldots, \alpha_M) = (1, \ldots, 1)$.

In practice, there is always a small probability that a transmission fails because the signal cannot be successfully decoded. The results described herein remain valid if $R_m(n)$ is redefined to represent the expected feasible rate, and the 0–1 variable $X_m(n)$ is modified to indicate both which user is selected and whether or not the transmission is successful.

Figure 3:
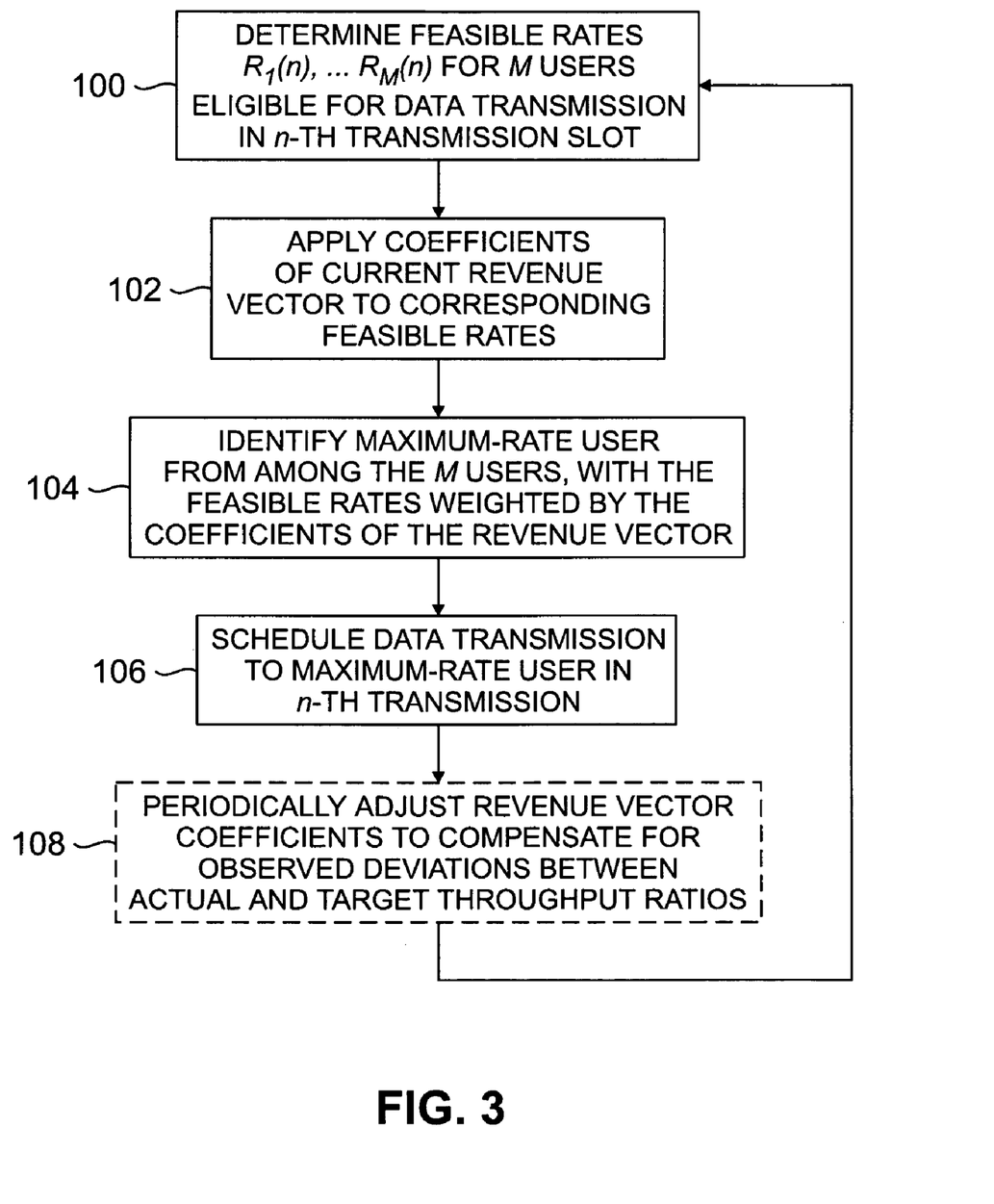
FIG. 3 is a flow diagram of the a data transmission scheduling process that is implemented in the base station of FIG. 2.

FIG. 3 is a flow diagram illustrating the general data transmission scheduling process described above. This process is implemented in the base station of FIG. 2, e.g., using software stored in memory 38 and executed by processor 36. In step 100, the base station determines the feasible rates $(R_1, \ldots, R_M)$ for the M users eligible for data transmission in the n-th transmission slot. The base station then applies in step 102 the coefficients of the current revenue vector to the corresponding feasible rates, so as to generate a set of weighted feasible rates for the M users. In step 104, the base station identifies the maximum-rate user from among the M users, and in step 106 schedules data transmission to the maximum-rate user in the n-th transmission slot. The revenue vector is periodically adjusted as indicated in step 108 so as to compensate for observed deviations between actual and target throughput ratios. Step 108 may but need not be repeated for each scheduling operation, and is therefore shown in dashed outline in the figure. After the scheduling operation in step 106, and the revenue vector adjustment, if any, in step 108, the process returns to step 100 to schedule data transmission for the next transmission slot.

In an alternative embodiment, instead of the expected feasible rate, one can take $R'_m(n) := K_m + R_m(n)$, using $K_m$ to obtain a weighted combination of received rates and slot allocations. More particularly, by choosing suitable values for $K_m$, one can give weight to balancing the proportion of slots allotted to the various users, while also achieving relative throughput targets.

Discrete Rate Distribution

This section will consider a case in which the feasible rates $(R_1, \ldots, R_M)$ have a discrete distribution on a bounded set $J \subseteq \mathbb{R}^M$. Since the feasible rates are assumed to be stationary in the illustrative embodiment, the description will focus on the class of stationary policies. However, the analysis may be readily extended to deal with non-stationary policies.

Let $p_j$ be the stationary probability that the feasible rate vector is $j \in J$. Define $R_{ij} = j_i$ for $j = (j_1, \ldots, j_M) \in J$. Let $x_{ij}^\pi$ be the probability that policy $\pi$ selects user i for transmission when the feasible rate vector is $j \in J$. Then the minimum average throughput achieved under policy $\pi$ is $$z^\pi = \min_{i=1,\ldots,M} T_i^\pi$$

with $$T_i^\pi = \sum_{j \in J} p_j R_{ij} x_{ij}^\pi.$$

Let $\pi^w$ be the revenue-based scheduling strategy corresponding to the vector $w=(w_1, \ldots, w_M)$. Without loss of generality, it may be assumed that $$\sum_{i=1}^{M} w_i = 1,$$

since only the relative values of the revenue coefficients matter.

Policy $\pi$ is optimal if $x_{ij}^\pi$, $z^\pi$ are an optimal solution to the following linear program:

$$\max z$$
$$sub\, z \leq \sum_{j \in J} p_j R_{ij} x_{ij}\; i = 1, \ldots, M$$
$$\sum_{i=1}^{M} x_{ij} \leq 1 \; j \in J$$
$$x_{ij} \geq 0 \; i = 1, \ldots, M, j \in J.$$

This implies that for an optimal policy $\pi$ at most $|J|+M-1$ of the variables $x_{ij}^\pi$ are non-zero, which forces most of the variables to be one. Thus, only for a limited number of rate combinations are the slots shared among several users.

It was noted above that a revenue-based policy which balances the throughputs is optimal. It can also be shown that the revenue criterion is in fact a necessary optimality condition, in the sense that there exists a revenue vector $w^*$ such that when user i does not have the maximum rate-reward product, i.e., $$w_i^* R_{ij} < \max_{m=1,\ldots,M} w_m^* R_{mj},$$

then $x_{ij}^\pi = 0$, i.e., user i should not be selected for transmission. Thus, any optimal scheduling strategy must be a revenue-based policy associated with $w^*$. More specifically, if policy $\pi$ is optimal, then there exists a vector $w^* \geq 0$ such that $$x_{ij}^\pi \left[ w_j^* R_{ij} - \max_{m=1,\ldots,M} w_m^* R_{mj} \right] = 0,$$

for all $i=1, \ldots, M$, $j \in J$.

Continuous Rate Distribution

This section will consider a case in which the feasible rates $(R_1, \ldots, R_M)$ have a continuous distribution on a bounded set $U \subseteq \mathbb{R}^M$.

Let $p(u)$ be the stationary density of the feasible rate vector, i.e., the probability that the feasible rates are in some set $V \subseteq U$ is $$\int_{u \in V} p(u) du.$$

Define $R_i(u)=u_i$ for $u=(u_1, \ldots, u_M) \in U$. Let $x_i^\pi(u)$ be the probability that policy $\pi$ selects user i for transmission when the feasible rate vector is $u \in U$.

Policy $\pi$ is optimal if and only if (iff) $x_i^\pi(u)$, $z^\pi$ are an optimal solution to the following mathematical program:

$$\max z$$
$$sub\, z \leq \int_{u \in U} p(u) R_i(u) x_i(u) du \; i = 1, \ldots, M$$
$$\sum_{i=1}^{M} x_i(u) \leq 1 \; u \in U$$
$$x_i(u) \geq 0 \; i = 1, \ldots, M, u \in U.$$

As noted previously, a revenue-based policy which balances the throughputs is optimal. It can also be shown that the revenue principle is in fact a necessary optimality criterion, in the sense that there exists a revenue vector $w^*$ such that if user i does not have the maximum rate-reward product on some set of non-zero measure, then user i should not be selected for transmission on that set. Thus, in the above sense, any optimal scheduling strategy must be a revenue-based policy associated with $w^*$. More specifically, if policy $\pi$ is optimal, then there exists a vector $w^* \geq 0$ such that $$\int_{u \in U} x_i^\pi(u) \left[ w_i^* R_i - \max_{m=1,\ldots,M} w_m^* R_m(u) \right] p(u) du = 0,$$

for all $i=1, \ldots, M$.

Adaptive Algorithms for Adjusting Revenue Vector

The previous two sections illustrate that revenue-based policies optimize throughput relative to pre-specified target values. However, as noted above, calculating the optimal revenue vector directly is a complicated problem, requiring detailed information on the channel statistics in the form of the joint stationary distribution of the feasible rates $(R_1, \ldots, R_M)$. The present invention avoids this problem by providing adaptive algorithms for determining the optimal revenue vector in an iterative fashion without the need for direct estimation of the frequency of occurrence of particular user rates. Starting from an arbitrary initial vector, the algorithms iteratively adjust the revenue vector coefficients to compensate for observed deviations from the target throughput ratios. The corrections ensure that discrepancies in throughput cannot persist. To ensure convergence to the optimal revenue vector, the size of the adjustments is gradually reduced.

The next two sections will assume that the channel state is governed by a discrete time irreducible Markov chain with a finite discrete state space S. When the channel state is $s \in S$, the feasible rates have a continuous M-dimensional distribution $F_s(\cdot)$ on $R \subseteq [R_{min}, R_{max}]^M$, $0 < R_{min} < R_{max} < \infty$, with zero probability measure in any set of Lebesgue measure zero. In practice, the feasible rates will typically have to be selected from a limited set of discrete values. However, it is possible to adhere to the above assumptions by simply adding a small random perturbation. By choosing the random perturbation to be sufficiently small, the true achieved throughputs should be arbitrarily close to the perturbed ones.

Denote by $$W := w \in \left\{ \mathbb{R}_+^M : \sum_{m=1}^M w_m = 1 \right\}$$

the set of all revenue vectors. For any $w \in W$, denote by $\Xi_m(w)$ the expected average throughput per slot received by user m under revenue vector w in stationarity. Define $$\Xi_{ave}(w) := \frac{1}{M} \sum_{m=1}^M \Xi_m(w), \Xi_{min}(w) := \min_{m=1,\ldots,M} \Xi_m(w),$$

$$\text{and } \Xi_{max}(w) := \max_{m=1,\ldots,M} \Xi_m(w)$$

as the average, the minimum, and the maximum expected throughput per slot under revenue vector w over all users, respectively.

The above assumptions ensure that the expected throughput vector $(\Xi_1(w), \ldots, \Xi_M(w))$ is completely determined by the revenue vector w, without the need to specify a tie breaking rule. The assumptions further imply that the expected throughput vector $(\Xi_1(w), \ldots, \Xi_M(w))$ is a continuous function of the revenue vector w.

Denote by w* the optimal revenue vector, i.e., the revenue vector which balances the expected throughputs. To simplify the description, it will be assumed that w* is unique, although the analysis may be modified in a straightforward manner for the case where there is a range of optimal revenue vectors.

Two-User Adaptive Algorithm

For illustrative purposes, an adaptive algorithm will be described in this section for the case of two users, denoted user 1 and user 2. The next section will describe an adaptive algorithm for the more general case of an arbitrary number of users.

Before describing the algorithm for the two-user case in detail, some additional notation will be introduced. First, let $w=w_1$, so that $w_2=1-w$. Denote $\Delta Y(n):=Y_1(n)-Y_2(n)$, and define $$U(N) := \sum_{n=1}^N \Delta Y(n)$$

as the difference in cumulative throughput between users 1 and 2 after N slots. The absolute difference $|U(N)|$ is referred to as the throughput gap. The throughput gap widens in the N-th slot if $$|U(N)| > \max_{n=1,\ldots,N-1} |U(n)|.$$

User 1 is said to be leading if $U(N)>0$, and is referred to as lagging otherwise, and vice versa for user 2. A cross-over occurs in the N-th slot if the leading and lagging users exchange positions, which means that the throughput gap changes sign, i.e., $U(N) U(N-1)<0$.

The adaptive algorithm for the two-user case may now be described as follows. In every slot, the user with the maximum revenue-rate product, at the current price, is selected for transmission. Thus, the n-th slot is assigned to user 1 if $w(n)R_1(n)>(1-w(n))R_2(n)$, and to user 2 otherwise (ties being broken arbitrarily). To drive the revenue vector w(n) towards the optimal revenue vector w*, the price is adjusted over time on the basis of the observed throughput realizations. As long as the throughput gap does not widen, the price is left unaltered. However, if the throughput gap does widen, then the price is changed in favor of the deficit user, thus at the expense of the surplus user. The price of the leading user is decreased by $\delta_{k(n)}$, while the price of the lagging user is simultaneously increased by the same amount.

To ensure convergence, a reset is triggered at every cross-over. The step size $\delta_{k(n)}$ is then reduced by incrementing k(n), with $\{\delta_k, k=1, 2, \ldots\}$ being a predetermined convergent sequence (e.g., $\delta_{k+1}=\delta_1 \rho^k$ with $\rho<1$, or $\delta_k=\delta_1 k^{-\beta}$ with $\beta>1$).

For the two-user adaptive algorithm described above, the revenue vector w(n) converges to the optimal price w* wp 1 (where wp 1 denotes "with probability 1," meaning "always" or "almost surely") and consequently the sequence z(n) converges to the optimal value $z^{\pi^{w^*}}$ wp 1.

Adaptive Algorithm for Arbitrary Number of Users

The adaptive algorithm described in the previous section for the case of two users may be extended directly to an arbitrary number of users through modification of the rule for when to trigger a reset. For example, if a reset is triggered at every cross-over of any pair of users, as in the two-user case described above, then resets may occur too rapidly in the case of several users. Two leapfrogging users may cause the step size to be quickly reduced, while still far removed from the other users. The revenue vector may then get trapped in a bias region, and never reach the optimal point. A more appropriate rule for the several-user case is to trigger a reset only when every user has become leading or lagging. It is nonetheless important to ensure that resets occur frequently enough compared to wrong moves, because otherwise the revenue vector may continue to become trapped in a bias region.

This section describes an alternative adaptive algorithm that is particularly well-suited for the case of an arbitrary number of users. This algorithm makes revenue vector updates based on sample periods of predetermined everincreasing size. Thus, the revenue vector updates occur at predetermined slots K(n), instead of randomly determined slots as before, with $L(n):=K(n+1)-K(n)$ the length of the n-th period. In every slot of the n-th sample period, the revenue vector sequence w(n) is used for selecting a user for transmission, with n used to index sample periods, rather than transmission slots as in the previous description.

To drive the revenue vector w(n) towards the optimal point w*, the prices are adjusted over time on the basis of the observed throughput realizations. The direction in which the revenue vector is modified at the n-th update is determined by a random vector v(w(n)) based on the throughput obtained during the n-th sample period when the revenue vector w(n) is used. The size of the n-th update is $\delta(n)=\delta_{k(n)}$, with $\{\delta_k, k=1, 2, \ldots\}$ being a predetermined convergent sequence. Thus, at the (n+1)-th update, the revenue vector is recursively determined as $$w(n+1)=w(n)-\delta(n)v(w(n)).$$

To ensure convergence, the step size δ(n) is reduced by incrementing k(n) every time a reset is triggered. Intuitively, resets should occur only rarely when the revenue vector is far from the optimal point w*, but should occur readily once the revenue vector is close to w*.

The update direction v(w(n)) is determined as follows. For every user, the empirical average throughput over the sample period is computed. The users are then partitioned into two groups: (a) those with above-average throughput; (b) those with below-average throughput. The prices of the above-average users are decreased, while the prices of the below-average users are increased. This ensures that, as the sample size grows, the empirical average throughputs will with high probability line up with the true expected throughputs, and the revenue vector will get closer to the optimal point w*.

More formally, denote by $X_m$ the throughput received by user m during a particular sample period in which revenue vector w is used, define $$X_{ave} := \frac{1}{M}\sum_{m=1}^{M} X_m$$

as the average throughput over all users, and denote by $\Omega^- := \{m: X_m \leq X_{ave}\}$ and $\Omega^+ := \{m: X_m > X_{ave}\}$ the groups of below-average and strictly above-average users, respectively; the revenue vector update direction v(w) is then determined as $$v_i(w) = \frac{w_i}{\sum_{m \in \Omega^-} w_m} \quad i \in \Omega^-,$$

$$v_j(w) = \frac{-w_j}{\sum_{m \in \Omega^+} w_m} \quad j \in \Omega^+.$$

Note that $\Omega^-$0 is always non-empty, since it is impossible for all users to have strictly above-average throughput. However, $\Omega^+$ may be empty in a case in which all users have exactly equal throughput. In that case, the revenue vector is simply left unaltered.

Also note that the price ratios within both $\Omega^-$ and $\Omega^+$ are maintained. This ensures that the expected throughput of the below-average users increases, while the expected throughput of the above-average users decreases.

The above revenue vector update cannot be applied in a case in which the prices of some of the users in $\Omega^+$ are zero. To prevent that situation from happening, the revenue vector update process may be restricted to the set $W_v := \{w \in W: w_m \geq v \text{ for all } m=1, \ldots, M\}$, with $v := R_{min}/(R_{min}+(M-1)R_{max})$. If $w_m \leq v$, then $\Xi_m(w)=0$, which implies that $w^* \in W_v$. In order to restrict the revenue vector update process to the set $W_v$, the update is truncated at the boundary if necessary.

To ensure convergence, a reset is triggered under the condition that every user has been a member of $\Omega^+$ at least once during a consecutive sequence of updates. Once the reset has occurred, the next one is not triggered until every user has been a member of $\Omega^+$ at least once again.

The above-described revenue vector update increases the throughputs of the users in $\Omega^-$ and decreases throughputs of the users in $\Omega^+$. This can be seen as follows. Let w, w'∈W be two revenue vectors and $\Theta^-, \Theta^+ \subseteq \{1, \ldots, M\}$ be two groups of users such that for all $$i \in \Theta^-, \frac{w'_i}{w_i} \geq \frac{w'_k}{w_k}$$

for all k≠i, and for all $$j \in \Theta^-, \frac{w'_j}{w_j} \leq \frac{w'_k}{w_k}$$

for all k≠j. Then $$\Xi_i(w') \geq \Xi_i(w) \quad i \in \Theta^-,$$

$$\Xi_j(w') \leq \Xi_j(w) \quad j \in \Theta^+,$$

As indicated above, when a correct revenue vector update direction is selected, the revenue vector should get closer to the optimal point w* by some definite amount. To measure distance from w*, a function T(·) is introduced which attains a unique minimum at w*. Define $\Gamma_\in := \{w \in W: \Xi_{max}(w) - \Xi_{min}(w) \leq \in\}$ as an "∈-neighborhood" of w*. The following assumption implies that if a correct direction is chosen, then outside $\Gamma_\in$ the reduction in the value of T(·) for small enough step size δ is at least δ times a constant of proportionality η.

There exist positive constants δ*>0, η>0, ξ>0 such that for all revenue vectors w∉$\Gamma_\in$, for any ξ-right direction v(w), and for any δ∈(0, δ*), $$T(w+\delta v(w)) \leq T(w)-\delta\eta.$$

One example of a function T(·) satisfying this assumption is $$T(w) := \Xi_{max}(w) - \Xi_{min}(w),$$

i.e., the maximum difference in expected throughout between any pair of users. By definition T(w*)=0, and T(w)≥0 for all w≠w*, with strict inequality in case the optimal revenue vector w* is unique. Another example of a function T(·) satisfying the above assumption is $$T(w) := \sum_{m=1}^{M} w_m \Xi_m(w),$$

i.e., the total expected revenue earned. As noted previously, the optimal revenue vector w* minimizes that quantity over all vectors in the set W, i.e., T(w*)≤T(w) for all w∈W, w≠w*, with strict inequality in case w* is unique.

The second example T(·) function, unlike the first, also satisfies the above assumption for various alternative options for selection of a revenue vector update direction, e.g., $$v_{i^*} = 1-\beta_n > 0 \quad i^* = \arg\min_{m=1,\ldots,M} X_m,$$

$$v_{j^*} = -1 \quad j^* = \arg\max_{m=1,\ldots,M} X_m,$$

and $v_k = \beta_n/(M-2)$ for all k≠i*,j*, for $\lim_n \beta_n = 0$, a given positive sequence. This alternative option is referred to herein as the "Update-Extreme" algorithm, while the basic implementation previously described will be referred to as the "Move-to-Average" algorithm.

The revenue vector sequence w(n) for both of these algorithms converges to the optimal revenue vector w* wp 1, and consequently the sequence z(n) converges to the optimal value $z^{\pi^{w^*}}$ wp 1.

The n-th sample is referred to as "ξ-right" if for every user the empirical average throughput is within ξ from the true expected throughput, i.e., $|X_m(n) - \Xi_m(w(n))| \leq \xi$ for all m=1, . . . , M. Otherwise the sample is referred to as "ξ-wrong."

The following points can then be made regarding the above-described example adaptive algorithms:

1. For any fixed ξ>0, the total number of ξ-wrong samples is finite wp 1.
2. The total number of resets is infinite wp 1.
3. The revenue vector sequence w(n) cannot converge to a point outside $\Gamma_\in$.
4. The revenue vector sequence w(n) visits $\Gamma_\in$ infinitely often.
5. The revenue vector sequence w(n) cannot move from $\Gamma_\in$ to outside $\Gamma_{2\in}$, infinitely often.

The illustrative embodiment as described above establishes convergence to the optimal revenue vector w* through selection of the step sizes $\{\delta_k, k=1, 2, \ldots\}$ as a convergent sequence. As one possible alternative, the step sizes may be kept fixed at a given value δ. In this case, it is expected that the revenue vector sequence will continue to oscillate around w*, but with smaller amplitudes for smaller values of δ. There is an inherent trade-off between the accuracy achieved on the one hand and the speed of the convergence, and thus the responsiveness to changing conditions, on the other hand. The value of δ then may be used to find the right balance between these two conflicting objectives.

Numerical Results

This section describes numerical results of experiments conducted to investigate the convergence properties of the adaptive algorithms described above. The results verify long-term convergence of the adaptive algorithms, and also illustrate transient performance, in particular the rate at which the revenue vector converges to the optimal vector.

Results are presented below for a total of seven experiments. The first three experiments to be described consider continuous rate distributions. The fourth experiment assumes a discrete distribution where the feasible rates are determined by a fading process via signal-to-noise ratio. The fading process is modeled using a discrete number of sinusoidal oscillators as described by Jakes' model, W. C. Jakes, "Multipath Interference," Microwave Mobile Communications, Ed. W. C. Jakes, IEEE Press, Piscataway, 1974. The final three experiments examine how well the throughput ratios are maintained, and how well the adaptive algorithms are able to track changes in channel conditions or throughput targets.

The first experiment considers a scenario with two users having independent exponential rates. The feasible rate for user i is governed by a conditional exponential distribution on an interval $[R_{min}, R_{max}]$, i.e., $$F_i(r) = G_i^{-1}[1 - e^{-\gamma_i(r - R_{min})}], r \in [R_{min}, R_{max}],$$

with $G_i = 1 - e^{-\gamma_i(R_{max} - R_{min})}$ a normalization coefficient, i=1, 2. The corresponding density $f_i(\cdot)$ for user i is $$f_i(r) = G_i^{-1} \gamma_i e^{-\gamma_i r}.$$

The normalized expected throughput received by user 1 as a function of the revenue vector w is $$\Xi_1(w) = \alpha_1^{-1} \int_{R_{min}}^{R_{max}} F_2\left(\frac{wr}{1-w}\right) f_1(r) dr,$$

and similarly for user 2, $$\Xi_2(w) = \alpha_2^{-1} \int_{R_{min}}^{R_{max}} F_1\left(\frac{(1-w)r}{w}\right) f_2(r) dr.$$

For this experiment, it was assumed that $[R_{min}, R_{max}] = [10, 400]$ Kbits/s and $(\gamma_1, \gamma_2) = (0.02, 0.01)$. Thus, the feasible rate for user 2 is about twice as large in distribution as for user 1. The throughput target for user 2 is also set twice as large as for user 1, i.e., $(\alpha_1, \alpha_2) = (1, 2)$.

Figure 4:
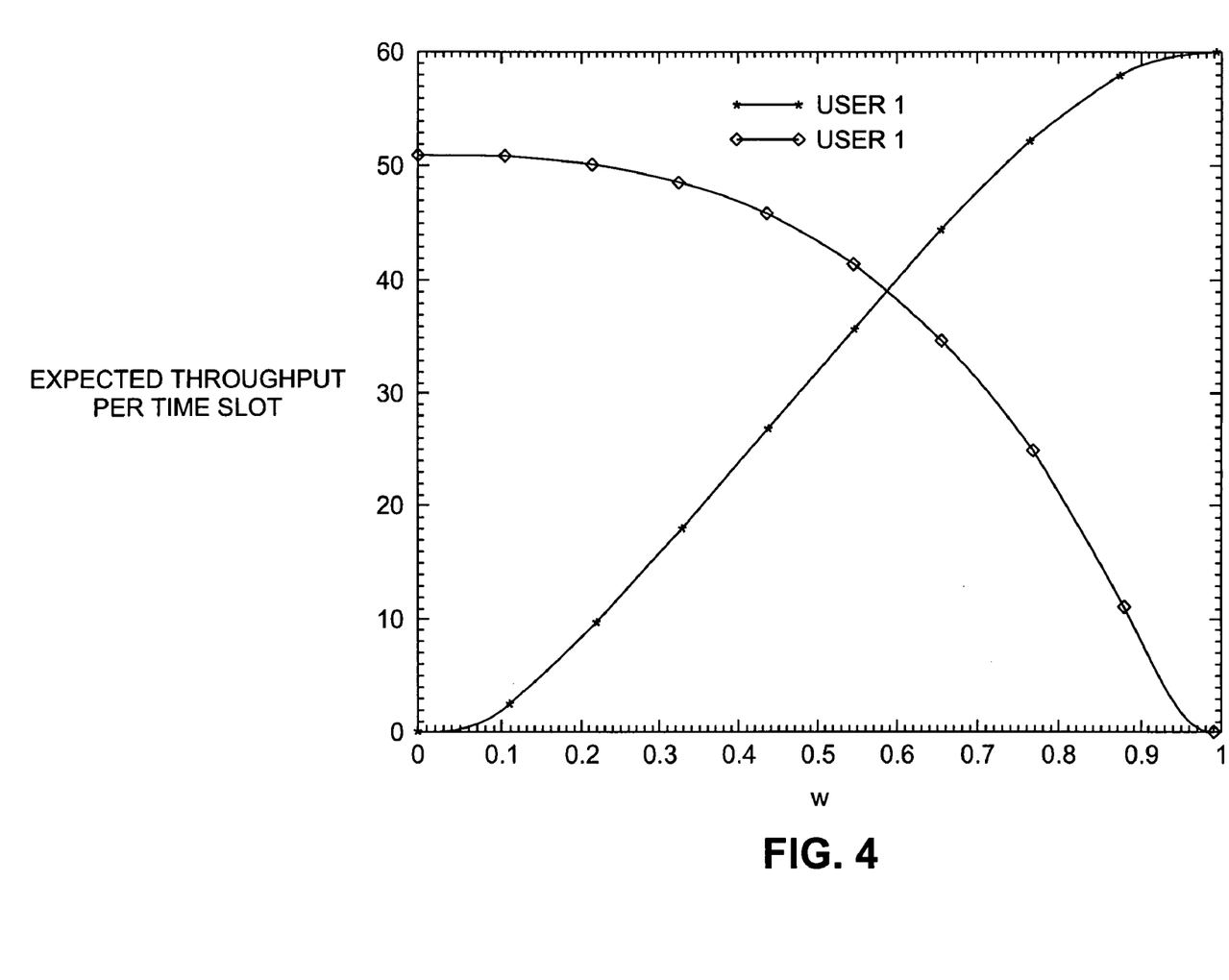
FIG. 4 shows a plot of expected throughput per time slot as a function of revenue vector coefficient for an example two-user case.

FIG. 4 shows a plot of the normalized expected throughput per time slot $\Xi_i(w)$ for the above parameters as a function of revenue vector w. From the figure, it can be seen that the optimal revenue vector is w*≈0.6, which may more precisely be determined as w*≈0.593 using bisection.

In the first experiment, the two-user adaptive algorithm described previously was run for 1000 slots, using step sizes $\delta_{k+1} = \rho^k \delta_1$, with initial value $\delta_1 = 0.5$ and reduction factor ρ=0.9. It was found that the revenue vector converges to the optimal vector in roughly 300 slots, which corresponds to about 0.3 seconds of operation.

The first experiment was repeated for non-geometric step sizes $\delta_k = \delta_1 k^{-\beta}$, with β successively chosen as 1.5, 2.0, 3.0, 4.0. It was found that the sum of the revenue vector changes is still convergent, although the step sizes decay slower than before. In addition, convergence is considerably slower for smaller values β, i.e., slower decay of the step sizes.

The second experiment considers a scenario with three users. As before, the feasible rate for user i follows a conditional exponential distribution on the interval [10, 400] with parameters $(\gamma_1, \gamma_2, \gamma_3) = (0.02, 0.01, 0.02)$. Thus, the feasible rate for user 2 is about twice as large in distribution as for users 1 and 3.

The target throughput ratios for the three users are set equal, i.e., $(\alpha_1, \alpha_2, \alpha_3)$ (1, 1, 1). The optimal revenue vector is w*≈(0.424, 0.152, 0.424) as may be determined using numerical integration and two-dimensional bisection. It was found that the optimal prices for users 1 and 3 are higher than for user 1, as is required in order to obtain equal throughput, since the feasible rate for user 2 is stochastically larger.

In the second experiment, the above-described Move-to-Average and Update-Extreme algorithms were run for 5000 slots, or approximately 5 seconds of operation, with L(n) =10n slots for the n-th update. This amounts to roughly 30 revenue vector updates. The initial revenue vector is set to w(1)=(0.3, 0.6, 0.1). The step sizes were $\delta_k = k^{-2}$, k=1, 2, . . . . The resulting revenue vector trajectories converge as expected. For example, the revenue vector for the Update-Extreme algorithm after 30 updates is w(30)≈(0.441, 0.123, 0.436), quite close to the optimal one.

The second experiment was repeated for the Update-Extreme algorithm using 40n and 60n slots for the n-th update, with the same power series for $\delta_k$. As expected, using fewer samples per update leads to a slower and 'noisier' convergence to the optimal revenue vector w*.

The third experiment considers a scenario with eight users. As before, the feasible rate for user i follows a conditional exponential distribution on the interval [10, 400]. The exponents were chosen at random uniformly in [0.01, 0.05], and turned out to be approximately (0.0489, 0.0263, 0.0139, 0.0480, 0.0220, 0.0107, 0.0461, 0.0128).

The target throughput ratios were again set equal for all users. As before, it was expected that a larger value of the exponent γ, inducing smaller feasible rates, requires a higher price in order to obtain equal throughput.

The Move-to-Average and Update-Extreme algorithms were run for 15,000 slots, or approximately 15 seconds of operation, with L(n)=30n slots for the n-th update. This amounts to roughly 55 updates. The initial revenue vector is set at random. The step sizes were $\delta_k = k^{-2}$, k=1, 2, . . . . The resulting revenue vector trajectories converged as expected.

As previously noted, the fourth experiment considers a scenario with discrete rates governed by independent fading processes as described by Jakes' model. The mean received powers of user 1, 2 and 3 are −15.0 dB, 0.0 dB, and −10.0 dB, respectively, which in conjunction with the Jakes' model fading process led to the following feasible rates per slot as a function of signal-to-noise ratio (SNR) in dB:

| SNR (dB) | Rate (bits) |
| --- | --- |
| −5.0 < SNR | 1000 |
| −10.0 < SNR ≤ −5.0 | 500 |
| −20.0 < SNR ≤ −10.0 | 250 |
| −30.0 < SNR ≤ −20.0 | 100 |
| SNR ≤ 30.0 | −30 |

The throughput target for user 2 was set twice as large as for users 1 and 3, i.e., $(\alpha_1, \alpha_2, \alpha_3) = (1, 2, 1)$. The Move-to-Average and Update-Extreme algorithms were run for 10,000 slots, with L(n)=n slots for the n-th update, using step sizes $\delta_k = k^{-3/2}$ and $\delta_k = k^{-2}$, k=1, 2, . . . .

As noted previously, the discrete rate values are perturbed by adding a small uniformly distributed random variable to obtain a continuous version of the problem. This ensures that the optimal control algorithm is determined by the revenue vector only.

In the fourth experiment, both algorithms converged as expected. For the Move-to-Average algorithm, the realized throughputs are reasonably close to the target ratios, provided the step size is reduced sufficiently slowly. In addition, the revenue vector converges fairly quickly, unless the step size is reduced so fast that the process gets essentially overdamped. For the Update-Extreme algorithm, the throughputs are approximately 130 bits per slot for both users 1 and 3 and 270 bits per slot for user 2, quite close to the target ratios. In addition, the revenue vector converges to the optimal value in about 5 seconds.

The fifth experiment was a repeat of the previous experiment for a forcing scheme which assigns the n-th transmission slot to the user m*(n) with the current minimum normalized throughput, i.e., $$m^*(n) = \arg \min_{m=1,\ldots,M} y_m(n)/\alpha_m.$$

By construction, the forcing scheme realizes the target throughput ratios perfectly, in the sense that with probability 1, $$\frac{y_i(N)}{y_j(N)} \to \frac{\alpha_i}{\alpha_j}, \text{ as } N \to \infty$$

for all pairs of users i,j=1, . . . , M.

The downside of the forcing scheme is that it generally achieves lower throughput in absolute terms, as it does not take advantage of the variations in the feasible rates. Under independent identical distribution (i.i.d.) assumptions, the throughput obtained under the forcing scheme may be computed in closed form. The decision as to whether or not the n-th slot is assigned to user i is entirely determined by the normalized cumulative throughputs, which only depend on the feasible rates in previous slots. Under the i.i.d. assumptions, the feasible rate for user i in the n-th slot is independent of the feasible rates in previous slots.

The above-described forcing scheme was run for a period of 5000 slots. The achieved throughputs were approximately 90 bits per slot for both users 1 and 3, and 180 bits per slot for user 2. The results show how tightly the target throughput ratios are maintained under the forcing scheme. In absolute terms, however, the throughput for all users is about 30% smaller than for the corresponding revenue-based scheduling technique of the present invention.

The remaining experiments to be described examine how well the adaptive algorithms of the invention are able to track sudden changes in the target throughput ratios or channel conditions. Each of these experiments considers a scenario which includes three users.

In the sixth experiment, the throughput target for user 3 is initially set to some low value. After 80 seconds, the throughput target is suddenly incremented to allow for the transmission of a data burst for user 3. The results for this experiment show that after a few oscillations the revenue vector quickly settles down to the new optimal value.

In the seventh and final experiment, the control is "cycled" approximately every 5 seconds. To test the tracking capability, the mean received SNR of user 3 is lowered at a rate of 5 dB/sec for 5 seconds. This is expected to lead to a rapid change in w*. The change in SNR is initiated after 15 seconds of simulation time, and stopped 5 seconds later.

Both the Move-to-Average and the Update-Extreme algorithm were run, for two different step sizes, $\delta_k = k^{-2}$ and $\delta_k = k^{-3/2}$. As expected, for both algorithms the revenue vector converges more slowly for the former step size. More specifically, with $\delta_k = k^{-2}$, convergence to the optimal revenue vector occurs after about 25 seconds, while for $\delta_k = k^{-3/2}$, the optimal revenue vector is approached shortly after 20 seconds but with stronger fluctuations around the optimal value.

In the interval where the power is being changed, the revenue vector adjustment remains fairly large, which is an advantage of the reset conditions.

It should be noted that the sequences L(n), $\delta_k$, or the cycle interval used in the above-described experiments should not be viewed as optimal values. Those skilled in the art will recognize that other values can be used, depending on the requirements of a given application. It should also be noted that filtering may be used to remove high-frequency components from a control signal used to adjust the revenue vector.

The foregoing description of the invention is intended to be illustrative only. For example, the particular configuration of the system 10 of FIG. 1 and the base station of FIG. 2 are for purposes of illustration only, and should not be construed as limiting the invention to any particular embodiment or group of embodiments. In addition, the particular data transmission scheduling implementations described herein are by way of example, and alternative embodiments of the invention may use other arrangements of processing steps.

It should also be noted that the example adaptive algorithms described herein may be enhanced by allowing the step sizes or the sample sizes to be adapted in response to non-stationary changes in the feasible rate declarations.

Since the adaptive algorithms of the present invention require only observations of feasible rates, they may also be used for admission control purposes. An advantage of such an arrangement is that a prospective user need not be allocated any resources until the admission control decision has been made.

The illustrative embodiment described above considered a scenario with only one user scheduled at a time and a single rate sample per user per slot. These conditions, however, are not essential for the underlying optimality principle to apply. Revenue-based policies which balance the throughputs continue to be optimal in situations where several users may be scheduled at a time and various auxiliary decisions may be taken.

As an example, consider a throughput optimization problem for two adjacent base stations, one located in cell 1 and another in cell 2. Let $R_m$ be the rate in a given slot for user m in cell 1 if both base stations transmit, and let $R'_m$ be the rate for user m if only base station 1 transmits. Let $R_l$ and $R'_l$ be defined similarly as the rate in a given slot for user 1 in cell 2. A revenue-based policy may then select the decision which maximizes revenue over all feasible options:

$$\text{Revenue} = \begin{cases} w_m^* R_m + w_l^* R_l & m \in 1, l \in 2 \\ w_m^* R'_m, & m \in 1 \\ w_l^* R'_l, & l \in 2. \end{cases}$$

In this example, the decisions as to which users are scheduled and which base station transmits (1 or 2 or both) are taken jointly. The revenue vector w* which balances the throughputs will be optimal, and may be found using the adaptive algorithms described previously. This approach may also be used in conjunction with scheduling of other system resources, such as antennas of an antenna system.

As previously noted, the data transmission scheduling techniques described herein can be implemented in whole or in part in the form of one or more software programs executed using appropriate system processing hardware, such as processor 36 and memory 38 in the apparatus of FIG. 2.

It should be noted that the above-described embodiments are illustrative only. For example, the adaptive algorithms described herein may be utilized for applications other than the specific communication network applications described herein.

As one particular illustration, the adaptive algorithms may be used in off-line applications such as cellular system planning and design. In a voice network using frequency hopped GSM with synchronized transmission slots, there may be, e.g., 12 frequencies and a small number of users per cell in each transmission slot, e.g., 3 such users, hopping between frequencies at random and whose signals mutually interfere. Because an encoded voice signal is made up of a number of hops, e.g., 8 hops, the voice signal may tolerate collisions where several users at once all randomly choose to hop onto the same frequency. The resulting interference may be controlled by appropriately setting the power levels of users. If it is desirable to achieve a particular error probability for a codeword, e.g., 2%, for the voice system, the adaptive algorithms may be used to adjust transmit power and find levels at which the error rate is acceptable for all users. Such an operation would typically be performed off-line rather than in real time.

As described previously, an adaptive algorithm in accordance with the invention can operate with multiple base stations, such as, e.g., in conjunction with a pair of base stations in a which a decision is to be made between serving one user in each base station or only one user from the two base stations. As another example, consider a single cell in which K=4 transmit diversity antennas are being used on the downlink. Each antenna is assumed to have a distinguishing pilot and the users give some indication as to their rate if they use a certain subset of the antennas. Each user might therefore suggest its "best antenna" and the rate it would achieve if assigned that antenna in a given transmission slot. The adaptive algorithm of the invention may then be used to assign users to antennas, such that a plurality of users may be assigned per transmission slot.

In one possible variation of the admission control aspects of the invention, an extra "dummy" version of an adaptive algorithm may be run with an extra user and its throughput target rate included. An admission determination may then be made by examining the rates which would be achieved if the extra user is included. If the result is acceptable, the extra user is admitted and the extra version of the algorithm is run with the corresponding new settings. Otherwise, the extra user is rejected and the original version of the adaptive algorithm is used.

It should also be noted that revenue adjustments made in accordance with the invention may be configured to depend on a degree of throughput difference, in place of, e.g., a constant though diminishing adjustment.

Numerous other embodiments can be configured to apply the scheduling techniques of the invention jointly to users at adjacent base stations, or for utilization in conjunction with diversity antennas.

These and numerous other alternative embodiments within the scope of the following claims will be readily apparent to those skilled in the art.

What is claimed is:

1. A method of scheduling data transmissions in a communication network, the method comprising the steps of:

identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and scheduling a data transmission of the particular user for the given transmission interval;

wherein the adaptive algorithm starts from an arbitrary initial revenue vector and iteratively adjusts the coefficients of the revenue vector to compensate for observed deviations between actual and target throughput, such that the deviations are reduced over time and the revenue vector converges to an optimal revenue vector.

2. The method of claim 1 wherein the communication network comprises a wireless communication system, and the data transmissions comprise downlink data transmissions from a given base station of the system to users of the system.

3. The method of claim 1 wherein the revenue vector is determined without direct estimation of the frequency of occurrence of particular user rates.

4. The method of claim 1 wherein at least a subset of the transmission intervals comprise fixed-duration transmission slots, with a data transmission for only one of the users occurring within a given one of the transmission slots.

5. The method of claim 4 wherein the adaptive algorithm updates the revenue vector based on randomly-selected transmission intervals.

6. The method of claim 1 wherein the identifying and scheduling steps are applied jointly to multiple users including at least one user at each of a plurality of base stations of the communication network.

7. The method of claim 1 wherein the identifying and scheduling steps are applied so as to take into account diversity antennas associated with one or more base stations of the communication network.

8. A method of scheduling data transmissions in a communication network, the method comprising the steps of:
identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and
scheduling a data transmission of the particular user for the given transmission interval;
wherein the maximum-rate user for which a data transmission is scheduled in an n-th transmission interval is a user $m^*(n)$ identified as follows:

$$m^*(n) = \arg\max_{m=1,\ldots,M} w_m R_m(n),$$

where $w_1, \ldots, w_M$ denote the coefficients of a revenue vector $w$, and $R_m(n)$ denotes the feasible rate for an m-th one of M users.

9. A method of scheduling data transmissions in a communication network, the method comprising the steps of:
identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and
scheduling a data transmission of the particular user for the given transmission interval;
wherein the feasible rates for M users comprise a set of feasible rates $(R_1, \ldots, R_M)$ having a discrete distribution on a bounded set $J \subseteq \mathbb{R}^M$.

10. A method of scheduling data transmissions in a communication network, the method comprising the steps of:
identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and
scheduling a data transmission of the particular user for the given transmission interval;
wherein the feasible rates for M users comprise a set of feasible rates $(R_1, \ldots, R_M)$ having a continuous distribution on a bounded set $U \subseteq \mathbb{R}^M$.

11. A method of scheduling data transmissions in a communication network, the method comprising the steps of:
identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and
scheduling a data transmission of the particular user for the given transmission interval;
wherein the adaptive algorithm adjusts one or more of the coefficients of the revenue vector in accordance with a specified step size $\delta_k$ in the form of a predetermined convergent sequence.

12. The method of claim 11 wherein the predetermined convergent sequence comprises a sequence $\delta_{k+1} = \delta_1 \rho^k$ with $\rho < 1$.

13. The method of claim 11 wherein the predetermined convergent sequence comprises a sequence $\delta_k = \delta_1 k^{-\beta}$ with $\beta > 1$.

14. A method of scheduling data transmissions in a communication network, the method comprising the steps of:
identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and
scheduling a data transmission of the particular user for the given transmission interval;
wherein the adaptive algorithm updates the revenue vector based on sample periods which increase in size as a function of time.

15. The method of claim 14 wherein the updates to the revenue vector occur at predetermined slots $K(n)$, with the length of an n-th sample period given by $L(n) := K(n+1) - K(n)$.

16. The method of claim 14 wherein the adaptive algorithm updates the revenue vector $w(n)$ for an n-th sample period in accordance with an update direction $v(w(n))$ based on throughput obtained during the n-th sample period when the revenue vector $w(n)$ is used, and further wherein at a subsequent update of the revenue vector for an (n+1)-th sample period, the revenue vector is recursively determined as $$w(n+1) = w(n) - \delta(n) v(w(n)),$$

where $\delta(n)$ denotes a step size of a predetermined convergent sequence.

17. The method of claim 16 wherein the update direction $v(w(n))$ is determined by averaging the actual throughput for each user over the sample period, partitioning the users into a first group with above-average throughput and a second group with below-average throughput, decreasing the revenue vector coefficient values for the users in the first group, and increasing the revenue vector coefficient values for the users in the second group, such that as the size of the sample period increases, the actual throughputs will approach specified target throughputs.

18. A method of scheduling data transmissions in a communication network, the method comprising the steps of:

identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and scheduling a data transmission of the particular user for the given transmission interval;

wherein the adaptive algorithm comprises at least one of an Update-Extreme algorithm and a Move-to-Average algorithm.

19. An apparatus for scheduling data transmissions in a communication network, the apparatus comprising:

a processor operative to identify for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm;and to schedule a data transmission of the particular user for the given transmission interval; and a memory coupled to the processor, the memory storing at least a portion of the revenue vector;

wherein the adaptive algorithm starts from an arbitrary initial revenue vector and iteratively adjusts the coefficients of the revenue vector to compensate for observed deviations between actual and target throughput, such that the deviations are reduced over time and the revenue vector converges to an optimal revenue vector.

20. A machine-readable storage medium having one or more programs stored therein for use in scheduling data transmissions in a communication network, wherein the one or more programs when executed implement the steps of:

identifying for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and scheduling a data transmission of the particular user for the given transmission interval;

wherein the adaptive algorithm starts from an arbitrary initial revenue vector and iteratively adjusts the coefficients of the revenue vector to compensate for observed deviations between actual and target throughput, such that the deviations are reduced over time and the revenue vector converges to an optimal revenue vector.

* * * * *

UNITED STATES PATENT AND TRADEMARK OFFICE
CERTIFICATE OF CORRECTION

PATENT NO. : 7,006,466 B2  Page 1 of 2
APPLICATION NO. : 09/803247
DATED : February 28, 2006
INVENTOR(S) : S.C. Borst et al.

It is certified that error appears in the above-identified patent and that said Letters Patent is hereby corrected as shown below:

Title Page
   On pages 1-2, in OTHER PUBLICATIONS, delete redundant second references to each of the following:

U.S. Appl. No. 09/517,659, filed Mar. 3, 2000, S. Stolyar et al., "Method of Packet Scheduling, With Improved Delay Performance, for Wireless Networks."
A. Bedekar et al., "Downlink Scheduling in CDMA Data Networks," Proc. IEEE Globecom '99, pp. 1-32, 1999.
P. Bender et al., "CDMA/HDR: A Bandwidth-Efficient High-Speed Wireless Data Service for Nomadic Users," IEEE Communications Magazine, vol. 38, pp. 70-77, 2000.

In the Specification:

Col. 7, line 7, between the commas in the equation please insert --...--.

Col. 7, line 53, between the commas in the equation please insert --...--.

Col. 9, line 37, between the commas in the equation please insert --...--.

Col. 11, line 62, between the commas in the equation please insert --...--.

Col. 13, line 44, please delete "0".

Col. 16, line 46, between the parentheticals please insert -- = --.

Col. 17, line 33, in the SNR (dB) column of the table before "30.0" please insert -- - --.

Col. 17, line 33, in the Rate (bits) column of the table before "30" please delete "-".

Col. 17, line 64, between the commas in the equation please insert --...--.

UNITED STATES PATENT AND TRADEMARK OFFICE
CERTIFICATE OF CORRECTION

PATENT NO. : 7,006,466 B2
APPLICATION NO. : 09/803247
DATED : February 28, 2006
INVENTOR(S) : S.C. Borst et al.

It is certified that error appears in the above-identified patent and that said Letters Patent is hereby corrected as shown below:

In the Claims:

Claim 9, col. 21, line 58, delete "Musers" and insert --M users--.

Insert the following claim:

--Claim 21
An apparatus for scheduling data transmissions in a communication network, the apparatus comprising:
a base station having at least one processing device associated therewith, the at least one device being operative to identify for a given transmission interval a particular user from among a plurality of users requesting data transmissions, the particular user being identified as a maximum-rate user after application of coefficients of a revenue vector to corresponding feasible rates of the plurality of users, the revenue vector being determined in an iterative manner using an adaptive algorithm; and to schedule a data transmission of the particular user for the given transmission interval;
wherein the adaptive algorithm starts from an arbitrary initial revenue vector and iteratively adjusts the coefficients of the revenue vector to compensate for observed deviations between actual and target throughput, such that the deviations are reduced over time and the revenue vector converges to an optimal revenue vector.--

Signed and Sealed this

Seventeenth Day of October, 2006

JON W. DUDAS
*Director of the United States Patent and Trademark Office*